United States Patent [19]

Joannou

[11] 4,164,764
[45] Aug. 14, 1979

[54] MAGNETIC HEAD POSITION REFERENCE SYSTEM

[75] Inventor: Kyriacos Joannou, Wayland, Mass.

[73] Assignee: Pericomp Corporation, Natick, Mass.

[21] Appl. No.: 814,294

[22] Filed: Jul. 11, 1977

[51] Int. Cl.² .......................... G11B 5/43; G11B 5/84
[52] U.S. Cl. ....................................... 360/77; 360/119
[58] Field of Search ................... 360/77, 78, 118, 119, 360/121, 122

[56] References Cited

U.S. PATENT DOCUMENTS

| | | | |
|---|---|---|---|
| 3,246,307 | 4/1966 | Stanley | 360/77 |
| 3,293,627 | 12/1966 | Auyang et al. | 360/77 X |
| 3,474,432 | 10/1969 | Sevilla | 360/77 |
| 3,491,347 | 1/1970 | Farrand | 360/77 |
| 3,751,599 | 8/1973 | Ogawa et al. | 360/121 |
| 3,806,902 | 4/1974 | Drees et al. | 360/121 X |
| 3,859,664 | 1/1975 | Chynoweth et al. | 360/118 X |
| 3,893,180 | 7/1975 | Braun et al. | 360/77 |
| 4,007,493 | 2/1977 | Behr et al. | 360/77 |
| 4,072,994 | 2/1978 | Takashima | 360/12 X |
| 4,074,326 | 2/1978 | Smith | 360/77 X |

FOREIGN PATENT DOCUMENTS 2402202 8/1974 Fed. Rep. of Germany ............ 360/77
45-35155 6/1967 Japan ......................................... 360/77

OTHER PUBLICATIONS

IBM Technical Disclosure Bulletin, vol. 16, No. 11, pp. 3757-3759, Apr. 1974, "Tri-bit Servo Pattern", C. Wallis.

Primary Examiner—John H. Wolff
Attorney, Agent, or Firm—Fred Jacob; Milton M. Field

[57] ABSTRACT

A position reference system is disclosed which provides an indication of the amount of mistracking of a magnetic head while the latter is stationed in its normal operating environment. The system is also capable of providing an indication of the spacing tolerances of a multi-core head. A special tracking medium is recorded against which the position of the head is compared. The sensitivity of the disclosed system permits a determination of mistracking as well as corrective adjustments to be made against visual observation only.

32 Claims, 19 Drawing Figures

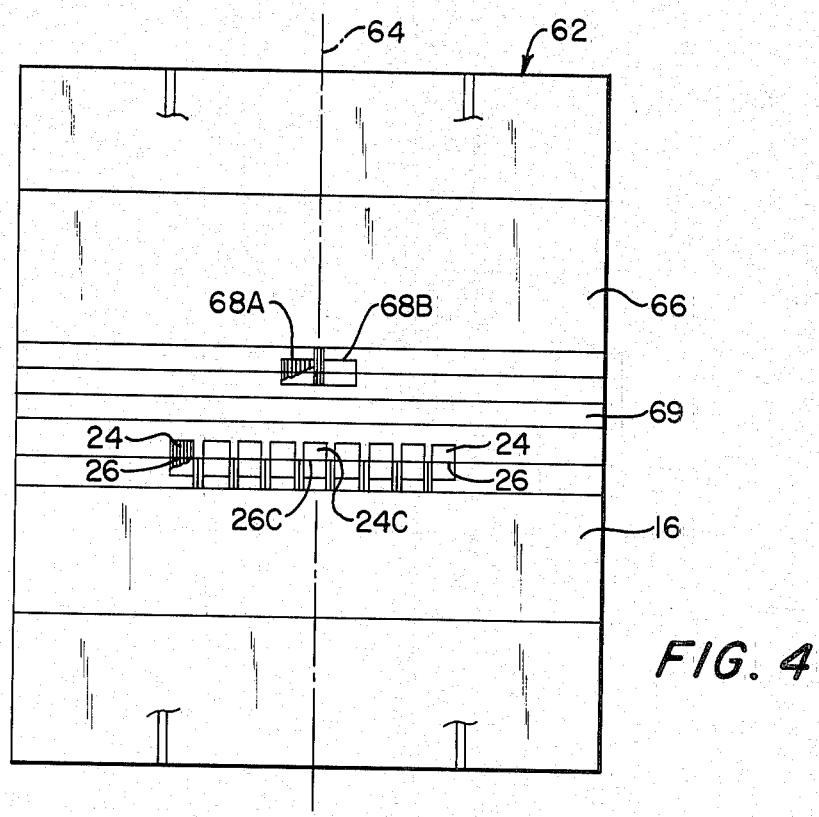
FIG. 4
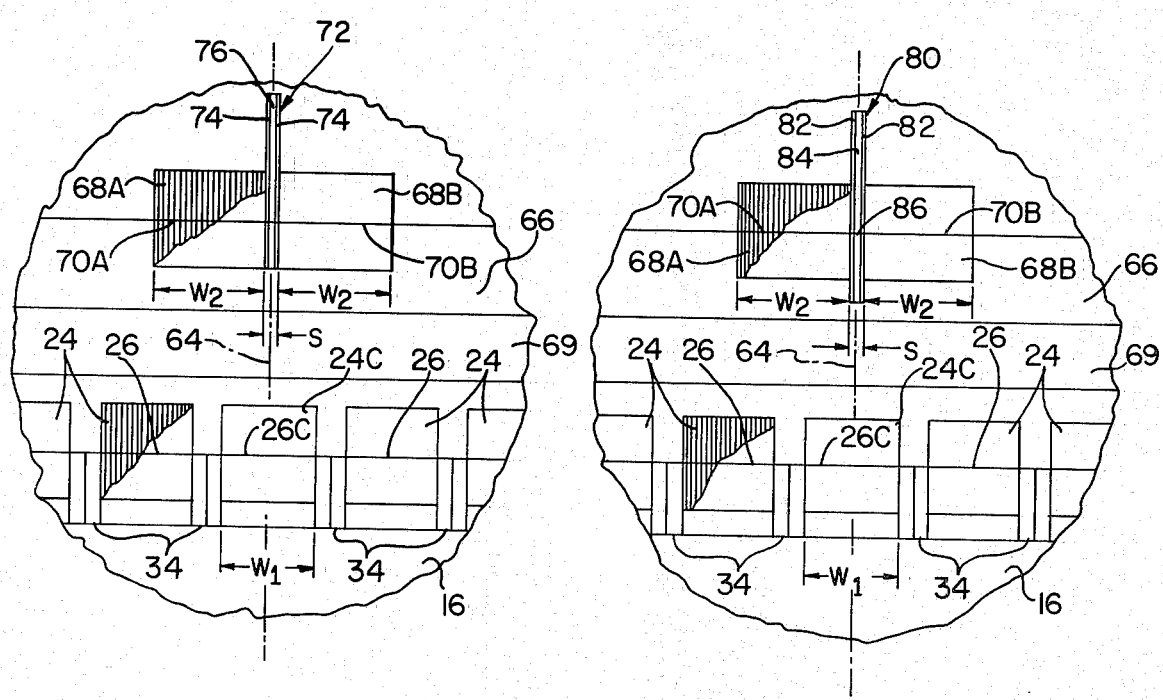
FIG. 5
FIG. 6

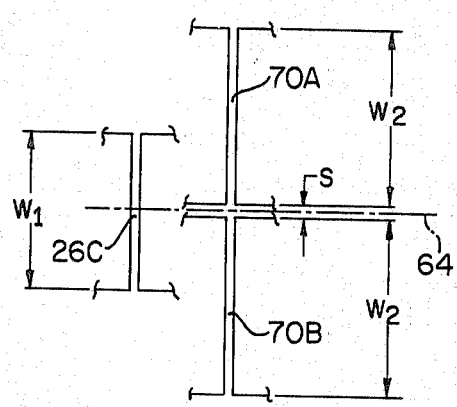
FIG. 7A
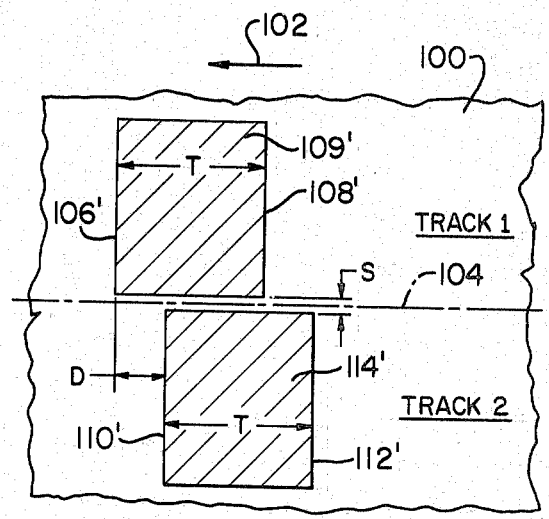
FIG. 7B
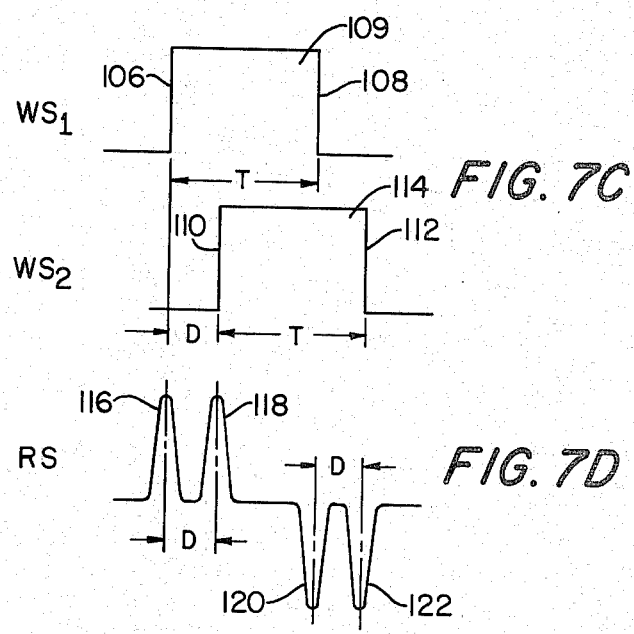
FIG. 7C
FIG. 7D
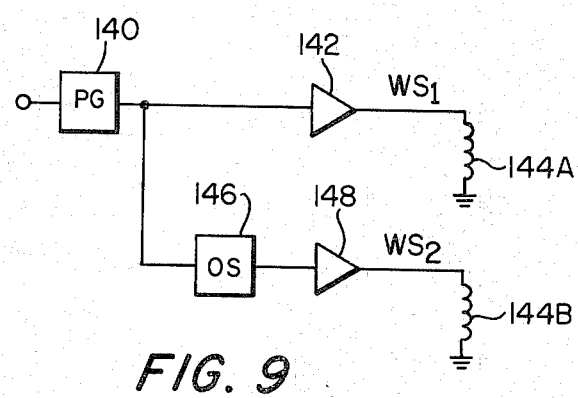
FIG. 9
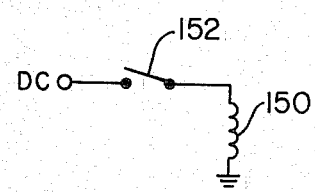
FIG. 10

MAGNETIC HEAD POSITION REFERENCE SYSTEM

The present invention relates in general to new and improved position reference systems, in particular to a position reference system for a magnetic head which is capable of providing an indication of the degree of mistracking of the head, as well as of the spacing tolerances of the cores of a multi-core head.

BACKGROUND OF THE INVENTION

Digital magnetic recording and readout equipment must have the capability of recording data at the prevailing data packing density and track spacing with sufficient accuracy to render the recording medium compatible with different pieces of equipment. Specifically, the recorded data must be capable of being reliably read out from the record medium using equipment other than that with which it was recorded. As packing densities have increased, greater performance demands have been placed on the equipment used for data recording as well as for data readout. For example, in present day commercially available magnetic tape recording equipment such as IBM 2400 Series tape handlers, data is recorded at densities which range between 200 and 800 bpi for NRZ-I recording in 7- and 9-track systems, while 9-track recording equipment, such as the IBM 3420 Series tape handler, is capable of recording at 1600 bpi PE and 6250 bpi GCR. As used herein, the expressions NRZ, GCR and PE designate the non-return-to-zero, group coded and phase encoded recording techniques respectively.

Consonant with the increase in the data packing densities, smaller spacings between the magnetic tracks on the recording medium have come into use as magnetic recording and readout equipment has become increasingly sophisticated. Thus, a center-to-center track spacing of 55 mil is common today for 9-track tape, while a 70 mil spacing is used with 7-track tape. For this type of recording, the spacing between adjacent tracks is normally 11 mil for a 9-track tape and 22 mil for a 7-track tape. Similar recording densities apply to disks of the type used in commercially available equipment, such as the Shugart 801 disk drive for floppy disks. Here the usual center-to-center track spacing may be 20 mil, while the spacing between adjacent tracks is 8 mil.

At such close track spacing, mistracking is a constant concern. Mistracking is present when undesired relative displacement occurs between the magnetic head and the recording medium in a direction normal to the center line of the head. Since the gaps are symmetrically positioned at right angles to the head center line, they will not be centered on their respective tracks when mistracking is present. Either the head, or the medium, or both may be responsible for a mistracking condition. Thus, the head may be laterally displaced from its designated position. On the other hand, the tape may be improperly positioned with respect to the head. This may occur for a number of reasons, one being the improper action of the tape capstans. For example, the capstans may not maintain the tape in the identical lateral position during forward and reverse tape motion respectively, due to skewing of the capstan axis.

When present, mistracking may result in errors of the data read out. For example, a particular core may be reading out data from a track adjacent to the desired one. If mistracking is present during recording, data may be recorded in the wrong track. In both instances errors or the loss of data may result. Even if the head as a whole is tracking properly, data errors and loss of data may occur with respect to one or more tracks of a multi-channel head due to variations in the mutual core spacing beyond predetermined tolerance limits.

Another detrimental effect of mistracking, particularly where magnetic tape heads are concerned, is excessive wear and often premature failure of the head. Under normal operating conditions, the tape edges tend to wear grooves into the head during prolonged use. Accordingly, many leads are provided with a pair of special grooves which bracket the cores of the head between them. The tape edges are in alignment with these grooves when the head is tracking properly. When there is mistracking, the tape edges are out of alignment with the grooves, with one edge moving toward the center of the head. In time, the wear on the head produced by the latter tape edge may cause the head to fail, as well as causing damage to the tape itself. For a normally busy magnetic tape transport, head failure due to uncorrected mistracking may occur in a matter of weeks.

In magnetic tape recording equipment, the head normally abuts a fixed reference surface. Resilient means located on the opposite side of the head urge the head against the reference surface and maintain its lateral position. Appropriate shims, provided between the head and the fixed reference surface, may be varied in order to align the head center line with the tape center line.

In magnetic disk recording equipment mistracking occurs when the head is not centered over the selected circular track. It is corrected by accurately positioning the center of the head in a radial direction over the center of each track and indexing the proper position on the head moving mechanism.

The problem of correcting mistracking lies in the fact that known techniques for doing so are complicated, cumbersome and time consuming and many require a trained specialist to carry them out. In accordance with one of the more accurate head positioning techniques employed, the track (or tracks) are developed by sprinkling the magnetic tape with a fine powder consisting of iron filings or the like. The iron filings adhere to the recorded portion of the track and make it visible to the naked eye. Positioning of the head over the developed track is then carried out by visual observation, usually under a microscope or similar means, to make an accurate determination of the degree of mistracking. Appropriate shims are interposed between the head and the fixed reference surface, as required, until zero displacement is indicated. Because the comparison between the head position and the reference tape must be made under the prevailing lighting conditions which are often less than ideal for the purpose, inaccuracies may occur. Further, since the comparison depends on the experience and the judgment of the observer, the observation is subject to interpretation and therefore it admits of the introduction of errors.

Other known techniques for determining the existence of mistracking rely on an electronic comparison of the position of the magnetic head under observation against a reference tracking medium. A number of these techniques employ frequency modulation to carry out the comparison. Aside from the fact that relatively expensive equipment is required to implement such a technique, the comparison requires a relatively long time interval, e.g. as much as one half the track length of a disk track. Thus, a band of pulses rather than discrete pulses is compared, with a consequent impairment of the achievable sensitivity of the comparison. These techniques are able to determine head mistracking to an accuracy of 1-2 mil, i.e. barely enough to guarantee compatibility of the recorded tape or disk. Additionally, the technique requires the services of a trained technician who can properly interpret the observed results and make the necessary adjustments. Thus, while this method of determining head mistracking is less cumbersome than the method it replaces, its sensitivity is barely adequate and the aforementioned factors combine to make its cost of implementation high.

OBJECTS OF THE INVENTION

It is a primary object of the present invention to provide a new and improved position reference system which is not subject to the foregoing disadvantages.

It is another object of the present invention to provide a highly sensitive position reference system capable of detecting head mistracking and core position variations to a heretofore unobtainable degree of accuracy.

It is a further object of the present invention to provide a new and improved position reference system whereby a quick determination of magnetic head mistracking may be made by a relatively untrained operator.

It is still another object of the present invention to provide a low-cost position reference system whereby magnetic head mistracking may be quickly and accurately determined by visual observation regardless of the prevailing lighting conditions.

It is still a further object of the present invention to provide a tracking medium adapted to serve as a position reference for a magnetic head, as well as apparatus and method for recording the medium and for using it to determine mistracking.

Still another object of the present invention is to provide a method for referencing a magnetic head with respect to a novel tracking medium.

These and other objects of the present invention together with the features and advantages thereof will become apparent from the following detailed specification when read in conjunction with the accompanying drawings in which like reference numerals designate corresponding parts.

BRIEF DESCRIPTION OF THE DRAWINGS

FIG. 4 illustrates a magnetic recording head in accordance with the present invention;

FIG. 5 illustrates a detail of the apparatus of FIG. 4;

FIG. 6 illustrates an alternative embodiment of the apparatus shown in FIG. 5;

FIG. 7 A-7D illustrates in schematic form the recording and readout technique of a tracking medium in accordance with the present invention;

FIG. 9 is an illustrative embodiment of a circuit for energizing a magnetic recording head in accordance with the present invention;

FIG. 10 is an illustrative embodiment of a circuit for energizing an erase core of a recording head in accordance with the present invention.

DESCRIPTION OF THE INVENTION

Figure 1:
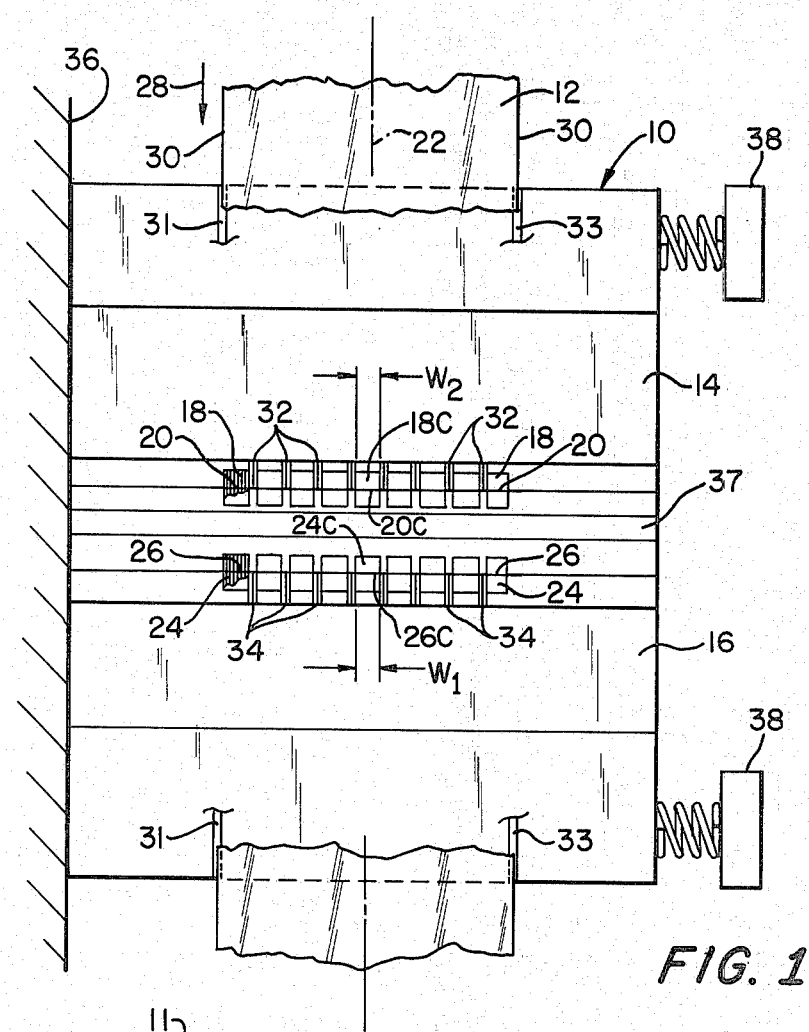
FIG. 1 illustrates a conventional read-after-write magnetic tape recording head with reference to a magnetic data tape.
Figure 2:
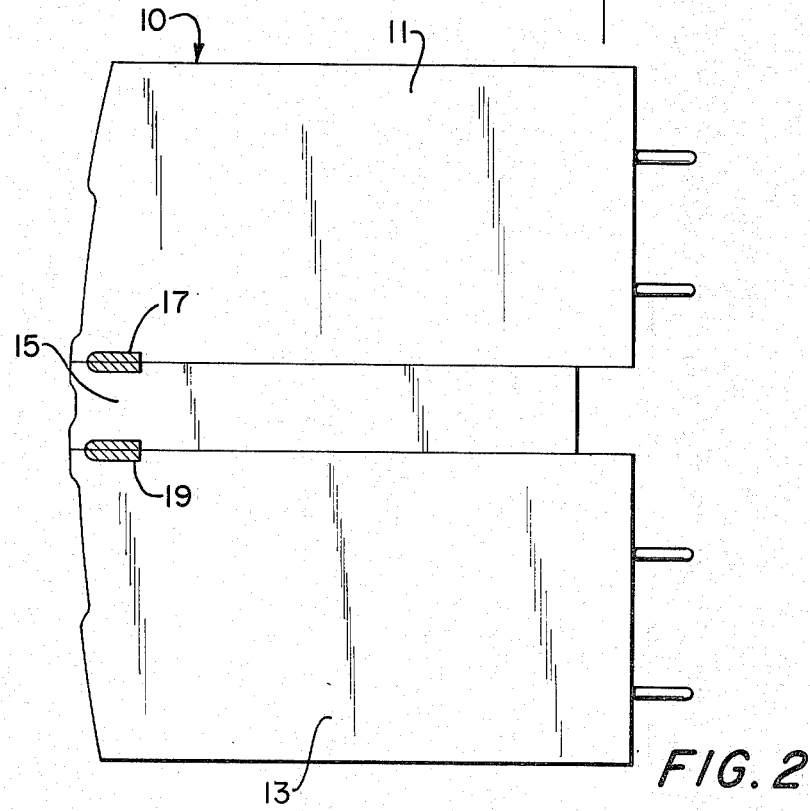
FIG. 2 is a side view of the apparatus of FIG. 1.

FIGS. 1 and 2 illustrate a conventional 9-channel read/write head 10 adapted to record and read nine parallel tracks on a magnetic tape. The head may be of the type used in the aforesaid IBM 2400 Series equipment. The tape is shown in dotted outline in FIG. 1 and is designated by the reference numeral 12. The center line of head 10 is aligned with center line 22 of tape 12 in FIG. 1 and is therefore not separately designated. The head consists of a write head portion 14 and a read head portion 16, joined into a unitary structure such that data readout can occur immediately following recording for purposes of verifying the recorded information.

Write head portion 14 comprises nine write cores designated by the reference numeral 18. Each core presents a write gap 20 to the tape. Write gaps 20 are aligned with each other in a direction normal to the head center line. Likewise read gaps 26 are presented to the tape. They too are aligned with each other in a direction normal to the head center line and hence they are parallel to write gaps 20. Each set of cores is positioned so that the corresponding gaps are symmetrically disposed with respect to the head center line. For both head portions, the center core and its gap are designated by the suffix "C". Since there is an odd number of write and read cores, the center cores 18C and 24C respectively, and hence gaps 20C and 26C respectively, each straddle the head center line.

Each write core 18 includes a winding, (omitted from FIGS. 1 and 2 for the sake of clarity), for pulsing the core at a predetermined frequency when it is desired to record on the magnetic medium positioned beneath the corresponding write gap. Similarly, each read core 24 carries a winding, (omitted for the sake of clarity), which serves to provide an output pulse for each recorded transition passing beneath the appropriate read gap. The write and read circuitry employed for this purpose is conventional and requires no further discussion.

For ease of manufacture, head 10 may be constructed of three separate component portions 11, 13 and 15, as shown in FIG. 2. Middle portion 15 carries the return section of each read and write core respectively, as well as an intermediately positioned shield 37. Each wound core section carries the core winding. These wound core sections are located in head portions 11 and 13 and mate with the aforesaid return core sections when the head is assembled. Thus, portions 11 and 15 respectively combine to form write head portion 14, while portions 13 and 15 form read head portion 16. The parts designated with the reference numerals 17 and 19 represent keying slots which extend the full width of head 10 to fix the positions of write and read cores 18 and 24 respectively.

For the purpose of explanation, tape 12 is assumed to be moving in the direction of arrow 28, i.e. the tape passes beneath write gaps 20 before encountering read gaps 26. It will be understood, however, that for purposes of readout alone the tape may move in either direction parallel to its center line 22. As shown in FIG. 1, the read and write cores respectively are positioned within the full tape width, which is typically one half inch for digital recording applications. Thus, tape edges 30 remain clear of the cores when head 10 is properly positioned with respect to the tape, i.e. with their respective center lines in alignment with each other. As shown in FIG. 1, the tape edges overlie a corresponding pair of grooves 31, 33 in head 10. For the sake of clarity the grooves are illustrated in part only in FIG. 1. However, it will be understood that each groove extends the full length of head 10, parallel to center line 22 at a preferred width of the order of 4 mil.

While not so limited, cores 18 and 24 typically consist of successive laminations, (omitted from the drawings for the sake of clarity), of a material such as Permalloy which has a relatively high coercive force. By way of example, each write core, and hence each write gap, may have a width $W_2$ of 44 mil. Each read gap may have a width $W_1$ of 40 mil so as to read within the track recorded by the corresponding write gap.

In order to inhibit cross talk between the respective channels, i.e. between tracks corresponding to the respective cores, and to preclude flux fringing in the space between the cores, shields 32 and 34 are characteristically provided between successive write and read cores respectively, parallel to the cores. The shields, which may consist of a layer of mu metal between two layers of copper, are preferably disposed only in head portions 11 and 13 where they extend beyond one end of the wound core sections. At the opposite end the housing extends into the space between adjacent core return sections and acts as a shield in head portion 15. A shield 37, which extends the full width of head 10, is positioned between the read and write gaps, parallel thereto, to inhibit flux coupling between the read and write cores. Shield 37 similarly consists of a mu metal lamination between a pair of copper laminations.

In its characteristic operating environment, head 10 abuts a fixed surface 36 of the tape transport, e.g. the surface of the back plate. It is urged against the latter by a pair of spring-loaded buttons 38, or similar resilient means. Digital recording takes place by pulsing one or more write cores 18 at the desired bit frequency while tape 12 moves relative to head 10. The resultant flux in write gaps 20 records appropriate tracks on the moving tape.

If mistracking is detected, e.g. between the recorded center track and read gap 26C of read core 24C, it can be corrected by inserting one or more shims between the head and the surface of back plate 36. It will be understood that such a position adjustment corrects for mistracking of the center read gap 26C, with respect to center line 22 of tape 12. By extension, such positioning also corrects for mistracking of the other cores 24 relative to their respective tracks on tape 12. However, if the other read cores 24 are improperly positioned with respect to the head center line, mistracking of these cores will not be fully eliminated by positioned read gap 24C as outlined above. The same thing is true for write cores 26 whose center core 26C is automatically positioned in alignment with the tape center line when core 24C is so positioned. The remaining cores 26 must be positioned within their allowable spacing tolerances in order to avoid mistracking with respect to their respective tracks.

It will be understood that recording and readout is not limited to a 9-channel arrangement. For example, the conventional half inch magnetic tape may also be employed in conjunction with a 7-track head wherein the individual cores and the gaps have a somewhat different relative spacing from that illustrated in FIG. 1 and described above. However, the center gap of a 7-track head similarly straddles the center line of the head symmetrically.

Figure 3:
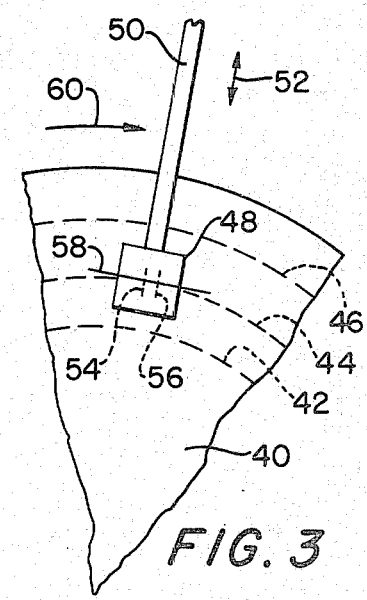
FIG. 3 illustrates a conventional magnetic disk recording head with reference to a magnetic disk.

FIG. 3 illustrates in schematic form a portion of the recording surface of a disk 40 which has a plurality of concentric, uniformly spaced tracks thereon. The relative dimensions are shown magnified in the drawing for the sake of illustration. An exemplary set of tracks is designated by track center lines 42, 44 and 46. A conventional disk head 48 is supported by an arm 50 which is adapted to move the head in or out in a radial direction, as indicated by arrow 52. Head 48 comprises a single write core and a single read core, which present a write gap 54 and a read gap 56 respectively to the recording surface of the disk. Gaps 54 and 56 are illustrated by means of broken lines to indicate that they are located in the surface of the head which faces disk 40. Both gaps straddle head center line 58 symmetrically. Thus, if head 48 is properly positioned, the track recorded by write gap 54 will symmetrically straddle center line 44.

When head 48 is mistracking, it will be radially displaced from center line 44. The head positioning mechanism, (not shown), must then be suitably actuated to move arm 50 and hence head 48 into the proper position. The mechanism is then indexed so that head 48 may be repeatedly positioned at the aforesaid head position with respect to track 44. The same procedure applies to all other tracks of the disk, such as tracks 42 and 46. Thus, head 48 must be suitably positioned over track center lines 42 or 46 in order to obtain proper tracking conditions with respect to these tracks.

In accordance with the present invention, a magnetic tracking medium is recorded which is adapted to serve as a position reference for the magnetic heads illustrated in FIGS. 1, 2 and 3 when the latter are disposed in their operating environment, i.e. on a tape transport or on a disk drive respectively. The tracking medium which suitably consists of a magnetic tape for the tape transport and of a magnetic disk for the disk drive respectively, is recorded by means of a special recording head. Such a head, designated by the reference numeral 62, is schematically illustrated in FIGS. 4 and 5 as to its pertinent portions. It will be seen that the overall geometry of the structure is substantially the same as that of head 10 in FIG. 1. Although a single read core 24C could be used, for ease of positioning the head read portion 16 is substantially identical with the like-numbered component of FIG. 1. Cores 24 are symmetrically positioned with respect to center line 64 of head 62, gaps 26 being aligned in a direction normal to the head center line. Center core 24C straddles center line 64 such that gap 26C is positioned perpendicularly athwart the latter.

Write head portion 66 of head 62 comprises a pair of substantially identical write cores 68A and 68B which symmetrically bracket center line 64. Each of cores 68 and 24 preferably consists of successive laminations of a high mu material such as Permalloy. A shield 69, which may be identical to shield 37 discussed in connection with FIG. 1 above, is positioned between read cores 24 and write cores 68 so as to limit flux fringing therebetween when cores 24 are energized.

FIG. 5 shows the position of write cores 68A and 68B in greater detail on opposite sides of head center line 64. Although the invention is not so limited, the dimensions of each core 68 are preferably substantially the same as those discussed above in connection with write cores 18 of magnetic head 10. Cores 68A and 68B have corresponding write gaps 70A and 70B aligned with each other in a direction perpendicular to center line 64. Cores 68A and 68B further carry windings 144A and 144B respectively, shown in FIG. 9 and explained in greater detail hereinbelow. A shield 72 is positioned in the space between cores 68A and 68B, extending from the return core portions to a point beyond the wound core portions and symmetrically straddling center line 64. Shield 72 comprises a pair of low-resistivity laminations 74, consisting of copper for example, and a mu metal lamination 76 positioned between laminations 74. In a practical embodiment of the invention, the thickness of shield 72 may be 3 mil, with each of laminations 74 and 76 being one mil thick. Thus, shield 72 establishes a spacing S between write cores 68 which is 3 mil wide in a preferred embodiment of the invention. As stated before, the width $W_2$ of each write gap 70 is preferably the same as the width of write gaps 18, i.e. 44 mil, although a larger width may be employed as shown in FIG. 5. The width $W_1$ of each read gap 26 is preferably 40 mil. While the foregoing dimensions are exemplary only, the following relationships hold true:

$s \leq 0.1\ W_1$; and $W_1 < < (2\ W_2 + S)$.

The presence of shield 69 inhibits flux fringing between write head portion 66 and read head portion 16 of head 62, while shield 72 inhibits cross talk resulting from flux fringing between write heads 68A and 68B. As previously explained, shields 34 are provided between adjacent read cores 24 and establish a mutual spacing of these cores on the order of 15 mil.

FIG. 6 illustrates a modification of the apparatus shown in FIGS. 4 and 5, incorporating a combination shield 80 between cores 68. A pair of mutually spaced shielding laminations 82, consisting of a low-resisitivity material such as copper, is positioned between cores 68A and 68B. An erase core 84 preferably consisting of a high mu material such as Permalloy, is positioned between laminations 82. Although the invention is not so limited, in a preferred embodiment core 84 and laminations 82 extend beyond both sides of cores 70A and 70B in a direction parallel to head center line 64. As shown, core 84 symmetrically straddles the head center line. In a preferred embodiment the thickness of core 84 is 2 mil and each lamination 82 has a thickness of 1 mil. Thus, while the spacing of cores 68A and 68B is 4 mil, core 84 presents erase gap 86 to the magnetic medium which is 3 mil wide. Erase gap 86, which is shown in FIG. 6 as being aligned with write gaps 70, may also be disposed behind that position with respect to relative tape motion, i.e. toward read portion 16.

Core 84 carries its own winding 150 which is adapted to be energized from a DC source, as shown in FIG. 10. Upon such energization erase gap 86 is adapted to erase the effect of any fringing flux from write cores 68 which is not shielded out by laminations 82, as explained in greater detail hereinbelow.

Tracking tape 100 may be recorded on a conventional tape handler, e.g. on IBM 2400 Series equipment, on which magnetic head 62 takes the place of a conventional tape head. The process of recording the tracking tape is illustrated in FIG. 7, using exaggerated dimensions for the sake of illustration. FIG. 7A shows in schematic form the applicable gaps of the head shown in FIGS. 4–6. Write gaps 70A and 70B are symmetrically spaced from each other on opposite sides of head center line 64. Spacing S between the gaps may contain either a shield or an erase head, as explained above in connection with FIGS. 5 and 6 respectively. Read gap 26C, which has a width $W_1$, is positioned symmetrically athwart head center line 64.

FIG. 7B illustrates a portion of a tracking tape 100 having a center line 104 positioned in alignment with head center line 64 of FIG. 7A. Tape 100, which is blank before recording begins, is assumed to move with respect to write gaps 70A and 70B in the direction of arrow 102. The respective center lines must be accurately aligned with each other before recording of the tracking tape is begun.

For recording purposes, a pair of pulse signals $WS_1$ and $WS_2$ is applied to windings 144A and 144B of cores 68A and 68B respectively to produce a flux in gaps 70A and 70B. The applied signals are substantially identical in amplitude and frequency, but out of phase with each other. FIG. 9 illustrates an exemplary circuit for providing pulse signals $WS_1$ and $WS_2$. A pulse generator 140 provides pulses at a predetermined fixed frequency, e.g. between 30 and 200 flux reversals per inch. The pulses are applied directly to a first write amplifier 142 the output of which is coupled to write winding 144. The output of pulse generator 140 is further coupled to a one shot multivibrator 146 which is in turn connected to a second write amplifier 148. The output of the latter amplifier is coupled to write winding 144B.

Multivibrator 146 introduces a predetermined delay such that the pulses of signal $WS_2$, applied to winding 144B, will lag the pulses of signal $WS_1$. The application of signals $WS_1$ and $WS_2$ produce corresponding flux pulses in write gaps 70A and 70B respectively. In this manner Tracks 1 and 2 are recorded on tape 100, as described above in connection with FIG. 7B.

As previously explained, FIG. 10 illustrates the application of a DC signal to erase winding 150. Suitable switching means 152 are connected between the DC source and winding 150. Since the erase core must be energized while recording by cores 68A and 68B takes place, switching means 152 is conveniently closed whenever the tape transport on which the tracking tape is to be recorded is first activated. Similarly, deactivation of the tape transport may be used to open switch 152.

FIG. 7C illustrates in idealized form a pair of write pulses of signals $WS_1$ and $WS_2$. Although only a single pulse 109 and 114 respectively is shown for each signal, it will be understood that a series of such pulses is applied to each write core winding for recording by the corresponding write gap. In a preferred embodiment of the invention the pulse frequency, (identical for the two write core windings), is chosen to provide in the range of 30 to 200 flux changes per inch of tape. The duration T of pulse 109 is determined by leading edge 106 and trailing edge 108 and may be between 60 and 200 microseconds in a practical embodiment of the invention.

As the tape moves with respect to gap 70A, the flux in this gap which results from the application of pulse 109, causes an area 109' to be recorded in Track 1, as shown in FIG. 7B. The length of recorded area 109' (in a direction parallel to the tape center line 104), is likewise designated by T and is bounded by leading and lagging transitions 106' and 108' corresponding to the leading and lagging edges respectively of the recording pulse. A time interval D following the initiation of pulse 109, a second write pulse 114 is applied to produce a flux in gap 70B. Pulse 114 likewise has a duration T, as defined by leading and trailing edges 110 and 112 respectively. The flux in gap 70B causes an area 114' to be recorded in Track 2, having a length T as determined by leading and lagging transitions 110' and 112' respectively. The latter transitions each lag corresponding transitions 106' and 108' respectively, by an interval D. In a practical embodiment of the invention, the length of T is chosen such that $$T/4 \leq D \leq T/2,$$

and it is preferably selected at T/3. The recorded areas have a mutual spacing S which corresponds to spacing S between gaps 70A and 70B. The presence of either shielding means alone or shielding means in conjunction with an erase gap between cores 68A and 68B, as shown in FIGS. 5 and 6 respectively, assures that the space between the tracks, which has a width S, is sharply defined by clean transition boundaries.

As previously mentioned, read gap 26C is positioned in a symmetrically straddling position with respect to head center line 64 and hence it is also symmetrically positioned with respect to center line 104 of tracking tape 100, when these two center lines are mutually aligned. Accordingly, signal RS, which is derived from the readout winding of the core that includes read gap 26C, will consist of equal contributions from Tracks 1 and 2, i.e. from recorded areas 109' and 114' respectively, as illustrated in FIG. 7D. As leading transition 106' of recorded area 109' passes under the read gap, a positive pulse peak 116 is produced. Likewise, when leading transition 110' of recorded area 114' passes under read gap 26C a positive pulse peak 118 is generated. The latter is displaced from peak 116 a sufficient distance to distinguish the separate peaks, such spacing being determined by the relative displacement D of transitions 106' and 109'. The amplitudes of pulses 116 and 118 are substantially identical due to the fact that read gap 26C overlies equal portions of recorded areas 109' and 114'. This may be readily verified through visual observation by means of an oscilloscope connected to receive the readout signal derived from the readout winding of core 24C.

When trailing transition 108' of recorded area 109' passes under the read gap, a negative pulse 120 is generated. Similarly, a negative pulse 122 is generated when trailing transition 112' of recorded area 114' passes under the read gap. Pulses 120 and 122 are also displaced a distance D with respect to each other and they are substantially identical in amplitude for the reason stated above. If desired, the peaks of signal RS may be observed on an oscilloscope coupled to the readout winding. Alternatively, they may be measured directly, or in amplified form, for comparison of the amplitudes of like-polarity peaks with each other. For greater accuracy the signal may be digitized and the peaks compared in that manner.

If special recording head 62 is properly constructed so that gaps 70A and 70B symmetrically bracket the head center line and readout gap 26C symmetrically straddles the latter, the readout discussed above following the recording of the tracking tape will normally yield only like-polarity peaks of equal amplitude. An amplitude differential may be present if, for example, write amplifiers 142 and 148 are not operating properly. Similarly, if readout occurs in the reverse direction of tape movement from recording, like-polarity peaks may have different amplitudes if the tape transport does not move the tape in precisely the same manner in opposite directions. Thus, the readout serves as a check against recording a faulty tracking tape.

Once the tracking tape is recorded, it is ready for use to position a conventional multi-channel read/write head of the type discussed above. In FIG. 8, which illustrates the comparison, only the gaps located in center channel 5 and in the extreme channels 1 and 9 are shown for the sake of clarity. The tracking tape is assumed to be substantially identical to tape 100 in FIG. 7B, having first and second pulse signals recorded in a pair of spaced tracks which extend the full length of the tape.

Figure 8A:
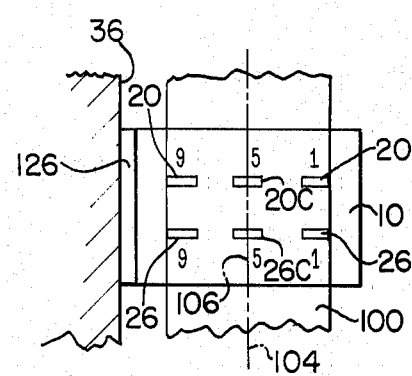
FIG. 8 A-8F illustrates the head position adjustment of a conventional magnetic head with reference to a tracking medium in accordance with the present invention.
Figure 8B:
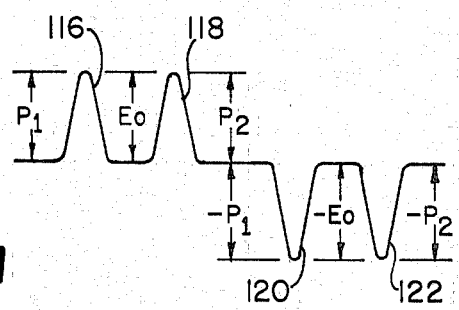

FIG. 8A shows head 10 in a centered position over tracking tape 100. Tape center line 104 is aligned with the center line 106 of the head, representative of correct tracking. A shim 126 is interposed between head 10 and backplate surface 36. As tracking tape 100 moves either in the forward or the reverse direction, as indicated by arrow 128, a readout signal is derived from read gap 26C, as shown in FIG. 8B. This signal is substantially identical to that derived upon readout following recording, as shown in FIG. 7D. Thus, positive pulse peaks 116 and 118, which correspond to positive transitions of the recorded areas, both have the same amplitude, i.e. $P_1 = P_2 = E_o$. Similarly, the negative pulse peaks 120, 122 both have the same amplitude, $-P_1 = -P_2 = -E_o$. The amplitudes of each pair of like-polarity peaks are equal because the readout signal derived from read gap 26C receives equal contributions from Tracks 1 and 2 when head 10 is centered.

As previously explained, it is possible for the tracking tape to be erroneously recorded, e.g. if write amplifier 142 and 148 are not operating properly, or if the drive capstans are moving the tape improperly. For this reason, a comparison of the amplitudes of the negative polarity peaks against each other provides a double check on the accuracy of the head position reference system.

Figure 8C:
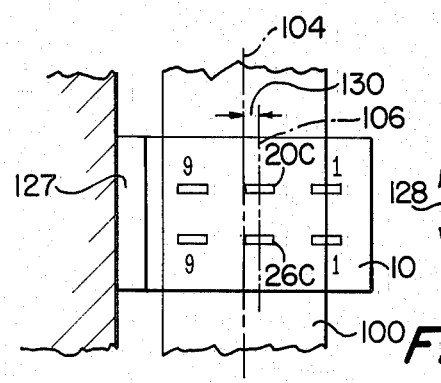
Figure 8D:
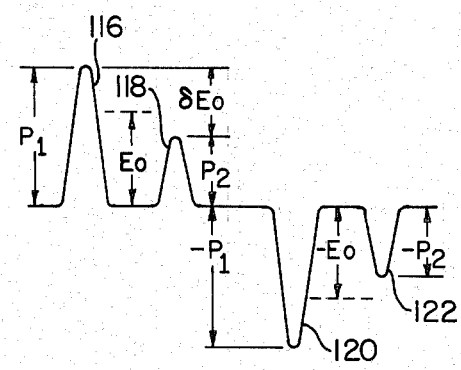

FIGS. 8C and 8D illustrate incorrect tracking where center line 106 of head 10 is displaced to the right of center line 104 of tracking tape, as indicated at 130. As discussed above, such mistracking may be due to variety of causes, e.g. a shim which is too thick as shown at 127. Under these conditions, read gap 26C overlies a larger portion of Track 1 and hence the amplitude $P_1$ of positive peak 116 exceeds $E_o$, as shown in FIG. 8D. Further, the amplitude $P_2$ of positive peak 118 is smaller than $E_o$ due to the fact that read gap 26C overlies a smaller portion of Track 2. The difference in the amplitudes of the two peaks, i.e. $P_1 - P_2$, equals $\delta E_o$.

A corresponding change occurs with respect to the negative pulse peaks which correspond to the trailing transitions of the recorded areas. If the tracking tape was properly recorded, the amplitude $-P_1$ of peak 120 will be equal in magnitude to that of peak 116, but of opposite polarity. Likewise, the amplitude $-P_2$ of peak 122 will be equal in magnitude but opposite in polarity to that of peak 118. Accordingly, $[-P_1] - [-P_2]$ will equal $\delta E_o$.

Figure 8E:
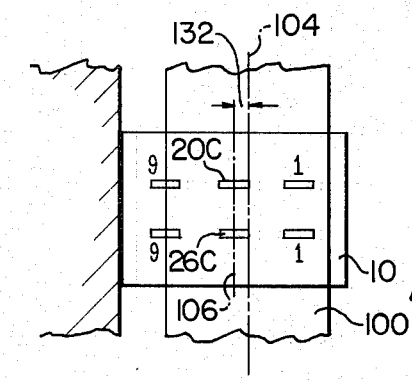
Figure 8F:
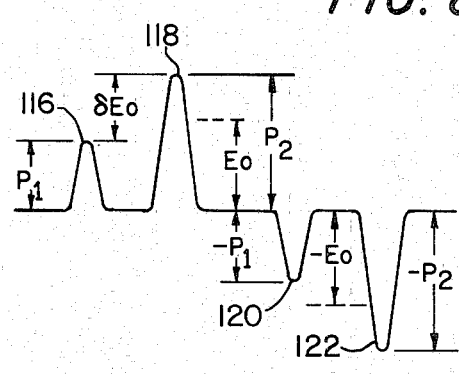

FIG. 8E illustrates incorrect tracking where the head center line 106 has a displacement 132 with respect to tape center line 104. Such a displacement may, for example, be due to insufficient shims or to an absence of any shims. In this situation, read gap 26C covers a larger portion of Track 2 than of Track 1. As shown in FIG.

8F, the manner in which the peak amplitudes now differ is reversed. The amplitude $P_1$ of positive peak 116 is smaller than $E_o$, while the amplitude $P_2$ of peak 118 exceeds that value. Similarly, peak 120 is less than $-E_o$ while peak 122 is greater. Again, $\delta E_o$ is measured as the difference in the amplitude of like-polarity peaks such that $$\delta E_o = P_2 - P_1 = [-P_2] - [-P_1]$$

A salient advantage of the present invention is the sensitivity of the system which permits accurate sensing of even a small amount of lateral head displacement. The sensitivity of the system disclosed herein is given by the expression $$\text{Sensitivity} = \delta E_o / E_o$$

For a 1 mil head displacement with respect to the tape center line, the system herein disclosed provides an 11% change of signal amplitude. This change is sufficiently large to be visually observable on an oscilloscope connected to the terminals of the readout winding of the read core in question, e.g. core 24C. Accurate head positioning can therefore be carried out through visual observation alone by a relatively untrained observer.

The method of recording the tracking tape has been explained above in conjunction with a special recording head which employs a single pair of write gaps symmetrically spaced on opposite sides of the head center line. As explained, although only a single read gap is utilized in such an arrangement, the head may be provided with a full complement of read cores, (depending on whether 9-track or 7-track tape is involved), to assist in positioning of the head. The present invention may be extended to a special recording head which includes a pair of mutually spaced write gaps corresponding to each of the nine (or seven) read gaps in the read head portion. Each set of gaps so provided is substantially identical in dimension and in relative spacing to the single set of gaps discussed above in connection with FIG. 7A, which is positioned at the center of the total number of sets. However, to avoid overlap by the write gaps of one set with the read gaps of the adjacent set, $W_2$ must be held to approximately 44 mil in such an arrangement.

When recording is carried out with such a head, nine pairs of write tracks will be recorded on the tracking tape. A tracking tape so recorded may be used to position head 10 in the same manner as explained in connection with FIG. 8. Specifically, only the readout signal derived from center read gap 26C is used for properly centering the head with respect to the tape. Once that is done, each of the read gaps of the read cores in channels 1-4 and 6-9 respectively, if properly spaced, should be centered with respect to its corresponding pair of tracks on the tracking tape. The relative amplitudes of like-polarity peaks in the respective readout signal derived from these read gaps then provides an indication of whether or not the position of the corresponding cores is within the permissible positioning tolerances.

The head position reference system which forms the subject matter of the present invention is not limited to a system for positioning magnetic tape heads, but is similarly applicable to other magnetic recording devices. For example, the tracking medium may comprise a tracking disk which has uniformly spaced pairs of tracks concentrically recorded thereon. Each track pair is symmetrically disposed about a separate concentric reference line positioned between the tracks, which corresponds to the track center line of a conventional data-carrying disk, e.g. to lines 42, 44 and 46 in FIG. 3. Thus, each track pair on the tracking disk provides a position reference for a separate radial position of a magnetic disk head of the type discussed in conjunction with FIG. 3.

To record these track pairs on the tracking disk, the special magnetic recording head requires only a single read gap and a pair of write gaps positioned with respect to the read gaps substantially as shown in FIG. 7A. During recording the head is positioned over the blank disk and it is advanced in step intervals to successive radial disk positions. The step intervals traveled by the head correspond to the desired track spacing of a conventional data-carrying disk. The center line of each data track on the disk shown in FIG. 3, is indicated by concentric lines 42, 44 and 46 respectively in FIG. 3. The blank disk has corresponding imaginary reference lines and Tracks 1 and 2 are symmetrically recorded on opposite sides of each reference line substantially as outlined and shown in conjunction with FIG. 7. The sole difference between this type of technique and the tape recording method discussed above resides in the fact that the angular disk motion causes a pair of concentric tracks, rather than a pair of parallel linear tracks, to be recorded. The concentric tracks of each track pair have first and second pulse signals recorded therein out of phase with each other, so that corresponding pulse edges are displaced by a time interval D from each other, substantially as described in conjunction with FIG. 7.

When the tracking disk is read out by a conventional disk head of the type shown at 48 in FIG. 3, radial head positioning can be carried out by observing the difference in the amplitude of peaks of like polarity of the readout signal. At each position where the peaks are equal in amplitude, the head positioning mechanism is indexed so that the head can be repeatedly moved to that position thereafter. Thus, the position of the disk head can be referenced substantially as described above in connection with a tape head in order to eliminate mistracking.

Although the foregoing operation contemplates that one pair of tracks be recorded on the disk for each track reference line, i.e. corresponding to each data track on a data-carrying disk, the invention is not so limited. Thus, a single pair of tracks may be recorded on the blank tracking disk, e.g. bracketing a reference line 44' which corresponds in position to track center line 44 of disk 40 in FIG. 3. Since the magnitude of the desired center-to-center track spacing of the corresponding data disk is known, the head positioning mechanism may then be indexed with reference to the single recorded track pair.

Figure 11:
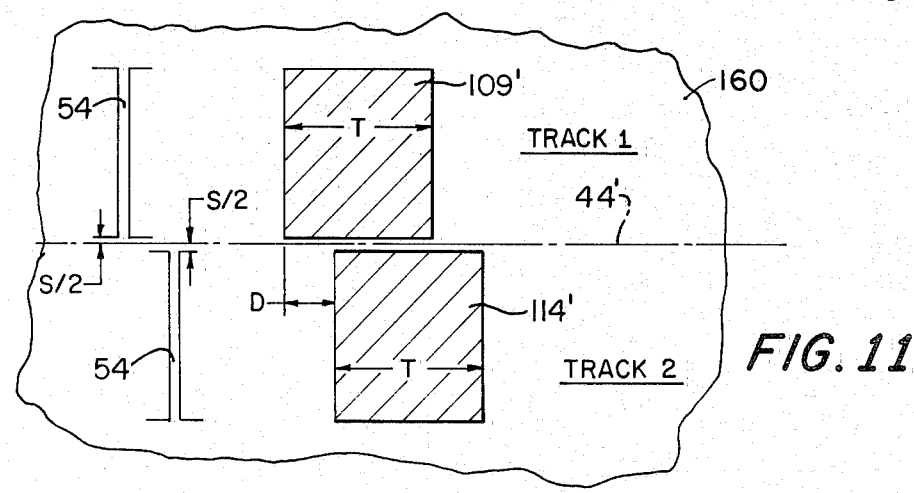
FIG. 11 illustrates an alternative technique for recording a tracking disk in accordance with the present invention.

A variation of the method described above for recording is shown in FIG. 11 for recording a tracking disk 160. In accordance with this method, a conventional disk head, such as head 48 in FIG. 3, is positioned off-track, e.g. with one edge of write gap 54 radially spaced a distance $S/2 = 1$ mil to one side of a concentric reference line, such as line 44'. When a first pulse signal is applied to the winding of the write core of head 48, e.g. at a predetermined frequency of 30 flux changes per inch, a series of pulses is recorded to form Track 1 as the disk passes beneath the off-centered write gap 54. This is illustrated in FIG. 11 by recorded area 109' which is representative of a single pulse of duration T. It will be noted that Track 1 is spaced 1 mil from the aforesaid reference line 44'. A suitable index mark on the disk may be used to reference the angular position of the leading transition of the recorded area, e.g. by initiating the pulse signal a fixed interval K following the appearance of the index mark.

Following the recording of the aforesaid first pulse signal, the head is positioned with write gap 54 radially spaced a distance S/2=1 mil on the opposite side of reference line 44'. A second pulse signal is applied substantially identical to the first pulse signal, but starting at time K+D following the appearance of the aforesaid disk index mark. In a preferred embodiment $D=T/3$. The recorded area 114' recorded by the second pulse signal is again shown for a single pulse only and is seen to have a length T and to be spaced 1 mil from reference line 44' on the opposite side thereof.

The pulse signals thus record a pattern substantially identical to that shown in FIG. 7B, except that the tracks formed are circular. Thus, positioning of the disk head in a radial direction may be carried out with respect to the tracks so recorded, substantially in the manner described above.

From the foregoing explanation it will be clear that the present invention is directed to a magnetic head position reference system wherein a tracking medium is recorded using special recording equipment or a conventional recording head in conjunction with a specific recording technique. The novel tracking medium is central to the invention herein which further includes the use of the tracking medium as a reference against which a magnetic head may be adjusted in order to eliminate mistracking.

While avoiding the disadvantages associated with prior art magnetic head position reference systems, the present invention provides a system which has more than ten times the sensitivity for the detection of mistracking. Such an improvement in the accuracy of detection is brought about using equipment which is relatively simple and inexpensive. The operation of such equipment requires only a low skill level and the detection of mistracking can be carried out in a fraction of the time required with prior art equipment.

Although the best mode contemplated for carrying out the invention has been disclosed herein, it will be clear that the invention lends itself to numerous variations and modifications within its disclosed scope. For example, substitutions for the specific material employed may be made, relative dimensions may be varied and the various steps of the methods disclosed may be modified, all without departing from the scope of the disclosed invention. Further variations, changes modifications and substitutions will now occur to those skilled in the art, all of which fall within the spirit and scope contemplated by the present invention. Accordingly, it is intended that the invention herein disclosed be limited only by the scope of the appended claims.

What is claimed is:

1. In a system for recording a magnetic tracking medium adapted to serve as a position reference with respect to magnetic recording and readout apparatus; said system comprising:
    a magnetic head including at least one read core having a read gap of width $W_1$ positioned for presentation to said tracking medium, said read gap being disposed symmetrically athwart the center line of said head and at right angles thereto;
    said head further comprising a pair of first and second substantially identical write cores corresponding to said read core, said write cores including respective first and second mutually aligned write gaps symmetrically positioned for presentation to said tracking medium on opposite sides of said head center line, said write gaps being parallel to said read gap and being spaced therefrom in a direction parallel to said head center line;
    said write gaps each having a width $W_2$ greater than $W_1$ and a mutual spacing S such that
    $S \leq 0.1 W_1$,
    and winding means carried by said write core for providing a magnetic flux in said write gaps upon energization;
    whereby said read core is adapted to verify recording by said write cores on said tracking medium.

2. In a recording system according to claim 1 wherein $W_1 << (2W_2+S)$.

3. In a recording system according to claim 2:
    first shielding means positioned between said read core and said write cores respectively and substantially parallel to said gaps; and
    second shielding means positioned in the space between said first and second write cores parallel to said center line and symmetrically straddling the latter.

4. In a recording system according to claim 3 wherein said second shielding means includes a pair of mutually spaced laminations of a low resistivity material symmetrically positioned on opposite sides of said center line, and a third lamination of a high permeability material positioned therebetween.

5. In a recording system according to claim 3 wherein said second shielding means comprises a pair of mutually spaced laminations of a low-resistivity material symmetrically positioned on opposite sides of said center line;
    an erase core positioned between said pair of laminations and including an erase gap symmetrically athwart said center line and normal thereto; and
    means for energizing said erase core to erase the effect of flux fringing in the space between said write cores.

6. In a recording system according to claim 3 wherein said head comprises:
    an odd plurality of read cores uniformly spaced from each other such that said first-recited read core is positioned at the center thereof, the read gaps of said plurality of read cores being aligned in a direction normal to said head center line;
    said first shielding means extending opposite each of said plurality of read cores; and
    further shielding means individually positioned between adjacent ones of said plurality of read cores.

7. In a recording system according to claim 3 wherein said read core and said pair of write cores form a first core set, said head comprising:
    an odd plurality of said core sets uniformly spaced from each other such that said first core set is positioned at the center thereof, the read and write gaps respectively of said plurality of core sets being aligned along a pair of mutually spaced lines normal to said head center line;

said first shielding means extending between the read and write cores respectively of each of said core sets;

separate ones of said second shielding means being positioned between each pair of write cores of said core sets; and further shielding means individually positioned between adjacent read cores and between adjacent write core pairs of said core sets.

8. In a recording system according to claim 7 wherein each of said second shielding means comprises a pair of mutually spaced copper laminations; and a lamination of mu metal disposed between each pair of said last-recited laminations.

9. In a recording system according to claim 7 wherein each of said second shielding means comprises a pair of mutually spaced copper laminations;

an erase core disposed between each pair of said last-recited laminations including an erase gap normal to said head center line; and means for energizing each of said erase cores to erase the effect of flux fringing in the space between each pair of said write cores.

10. In a recording system according to claim 1:

means for providing relative motion between said head and said tracking medium in a direction normal to said gaps;

means for energizing the winding means of said first and second write cores with substantially identical first and second pulse signals respectively out of phase with each other, each of said pulse signals including a series of pulses of a duration T defined by the leading and trailing edges of each pulse;

said leading and trailing edges respectively of said second pulse signal lagging the corresponding edges of said first pulse signal by a time interval D, where $T/4 \leq D \leq T/2$;

whereby said write gaps are adapted to record said pulse signals in a pair of parallel tracks on said tracking medium to define a space between said tracks having a width S and being substantially free of any recording.

11. In a recording system according to claim 10 wherein $D = T/3$.

12. In a recording system according to claim 11 wherein said tracking medium is a tracking disk, and further including means for radially moving said head in uniform step intervals with respect to said disk to record said pulse signals in a plurality of concentric track pairs on said disk.

13. In a recording system according to claim 11 wherein said tracking medium is a tracking tape having a center line in alignment with said head center line.

14. In a recording system according to claim 13 wherein said read core and said pair of write cores form a first core set, said head comprising:

an odd plurality of said core sets uniformly spaced from each other such that said first core set is positioned at the center thereof, the read and write gaps respectively of said plurality of core sets being aligned along a pair of mutually spaced lines normal to said head center line; and each pair of said write cores of said plurality of core sets being adapted to record a corresponding pair of tracks upon energization of its associated windings by said pulse signals.

15. A method of recording on a magnetic tracking medium adapted to serve as a reference for positioning a magnetic head in a direction normal to the center line of said head, said head including at least one read gap of width $W_1$ symmetrically athwart said center line and normal thereto;

said method comprising the steps of:

magnetically recording a first pulse signal at a predetermined frequency to form a first track on said medium, said first pulse signal comprising a series of recorded first pulses each having a length T defined by leading and trailing edges;

magnetically recording a second pulse signal at said predetermined frequency to form a second track on said medium parallel to said first track and spaced a distance S from the latter,
where $S \leq 0.1 W$;

said second pulse signal comprising a series of recorded second pulses substantially identical to said recorded first pulses and out of phase therewith, the leading and trailing edges of each second pulse lagging the corresponding edges of the corresponding first pulse by a distance D,
where $T/4 \leq D \leq T/2$, whereby said magnetic tracking medium is adapted to provide an indication of the amount of mistracking of said head.

16. The method of claim 15 and further including the step of erasing the effects of all recording in the space between said first and second tracks.

17. A recording method in accordance with claim 15 wherein each of said tracks is recorded at a width $W_2$ such that
$W_1 << (2W_2 + S)$.

18. A tracking medium for referencing the position of a magnetic head in a direction normal to the center line of said head, said head including at least one read gap of a width $W_1$ symmetrically athwart said center line and perpendicular thereto;

said tracking medium comprising:

at least a pair of first and second parallel tracks magnetically recorded on said medium, said tracks defining a reference line symmetrically positioned therebetween and parallel thereto, the facing boundaries of said tracks being spaced a distance S from each other,
where $S \leq 0.1 W_1$;

each of said tracks having a width $W_2$ greater than $W_1$ such that
$W_1 << (2W_2 + S)$;

said first and second tracks comprising substantially identical first and second pulse signals respectively recorded on said medium out of phase with each other by a pair of write gaps positioned substantially normal to said reference line on opposite sides thereof and having a mutual spacing and width dimension substantially identical to those of said tracks, each of said pulse signals including a series of pulses recorded at substantially the same predetermined frequency wherein each pulse has a length T defined by leading and trailing edges, corresponding leading and trailing edges respectively of said pulse signals being displaced relative to each other by a distance D;
where $T/4 \leq D \leq T/2$, whereby said magnetic tracking medium is adapted to provide an indication of the amount of mistracking of said head.

19. A tracking medium according to claim 18 wherein the space between said tracks is substantially free of any recording.

20. A tracking medium according to claim 18 wherein $D = T/3$.

21. A tracking medium according to claim 18 in the form of a tracking disk, said pair of tracks being concentric with each other symmetrically spaced from the intermediately positioned reference line;
whereby said pair of tracks defines a discrete radial position of said head centered on said intermediately positioned reference line.

22. A tracking disk according to claim 21 comprising a plurality of said track pairs uniformly spaced from each other in a radial direction, repsective reference lines of said plurality of track pairs defining a corresponding plurality of discrete radial head positions corresponding to the desired center-to-center track spacing of a data-carrying disk.

23. A tracking medium according to claim 18 in the form of a tracking tape having a center line coincident with said reference line.

24. A tracking tape according to claim 23 comprising a plurality of said track pairs uniformly spaced from each other in a direction normal to said center line and including said first-recited track pair at the center thereof;
whereby said tracking tape is adapted to provide a position reference for each read gap of a multichannel head.

25. A system for referencing the position of a magnetic head in a direction normal to the center line of said head, said head including at least one read gap of a width $W_1$ symmetrically athwart said center line and perpendicular thereto;
said system comprising:
a tracking medium;
at least a pair of first and second parallel tracks magnetically recorded on said medium, said tracks defining a reference line symmetrically positioned therebetween and parallel thereto, the facing boundaries of said tracks being spaced a distance S from each other, where
$S \leq 0.1 W_1$;

each of said tracks having a width $W_2$ greater than $W_1$ such that
$W_1 << (2W_2 + S)$;

said first and second tracks comprising substantially identical series of first and second pulses respectively recorded therein at substantially the same frequency out of phase with each other, each of said pulses including leading and trailing edges to define a pulse length T, each of said leading and trailing edges of said second pulses lagging the corresponding edges of said first pulses by a distance D; where
$T/4 \leq D \leq T/2$;

readout means including said read gap for deriving a readout signal from said head upon relative motion between said head and said tracking medium in a direction normal to said read gap with the latter disposed perpendicularly athwart said reference line, said readout signal including a pair of spaced peaks of a first polarity corresponding to the leading edges of said first and second pulses and a pair of spaced peaks of opposite polarity corresponding to the trailing edges of said first and second pulses; and
means for comparing peaks of like polarity of said readout signal to determine the amplitude difference therebetween representative of mistracking of said head.

26. A system in accordance with claim 25 and further including means for adjusting the position of said head in a direction perpendicular to its center line until said peaks of like polarity have substantially the same amplitude.

27. A system in accordance with claim 26 wherein said tracking medium is a tracking disk including at least one pair of said tracks concentrically disposed thereon, said tracks defining a reference line symmetrically positioned therebetween;
said head adjusting means being adapted to index the position of said head in a radial direction with respect to said reference line.

28. A system in accordance with claim 26 wherein said tracking medium is a tracking disk including a plurality of said track pairs uniformly spaced from each other in a radial direction, each of said track pairs defining a reference line symmetrically positioned between the tracks thereof;
said head adjusting means being adapted to index the position of said head in a radial direction with respect to each of said reference lines.

29. A system in accordance with claim 26 wherein said tracking medium is a tracking tape having a center line coincident with said reference line and said head adjusting means is adapted to position said head in a direction normal to said tape center line.

30. A system in accordance with claim 29 wherein said tracking tape comprises a plurality of said track pairs uniformly spaced from each other in a direction normal to said tape center line and including said first-recited track pair at the center thereof;
said head including a plurality of said read gaps uniformly spaced from each other, said plurality of read gaps being aligned in a direction perpendicular to said head center line such that said first-recited read gap is disposed substantially at the center thereof;
said readout means further comprising means including separate ones of said read gaps for deriving corresponding readout signals from the pulses recorded in respective ones of said track pairs; and
means for comparing peaks of like polarity derived from each of said readout signals to determine any deviation from a prescribed spacing of the corresponding read gap relative to the center line of said head.

31. A system in accordance with claim 25 wherein $D = T/3$.

32. A system in accordance with claim 29 wherein said comparing means comprises an oscilloscope connected to receive said readout signal.

* * * * *